(12) United States Patent
Chui

(10) Patent No.: US 7,792,652 B1
(45) Date of Patent: Sep. 7, 2010

(54) OSCILLATOR CALIBRATION FOR MOTOR CONTROLLER

(75) Inventor: Siew Chui, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/128,505

(22) Filed: May 28, 2008

Related U.S. Application Data

(60) Provisional application No. 60/940,837, filed on May 30, 2007.

(51) Int. Cl.
*G01R 35/00* (2006.01)
*H03L 7/00* (2006.01)
*H04B 1/20* (2006.01)
(52) U.S. Cl. .................. 702/89; 331/2; 369/8
(58) Field of Classification Search .............. 702/89, 702/57, 79, 81, 84, 85, 90, 106, 107, 176, 702/178, 182, 183; 369/8, 19, 47.36, 60.01, 369/128, 129; 73/1.01, 1.42; 700/108, 109; 331/2, 13, 18, 23, 25, 34, 44, 46–48, 55, 331/158; 327/141–144
See application file for complete search history.

(56) References Cited

U.S. PATENT DOCUMENTS

| 6,735,540 | B2 * | 5/2004 | Pedrazzini et al. | 702/79 |
| 7,394,324 | B2 * | 7/2008 | Diorio et al. | 331/44 |
| 2007/0069827 | A1 * | 3/2007 | Haiut | 331/57 |
| 2008/0001744 | A1 * | 1/2008 | Batra et al. | 340/572.1 |

* cited by examiner

*Primary Examiner*—Michael P Nghiem
*Assistant Examiner*—Toan M Le

(57) ABSTRACT

Systems, methods, and apparatuses including computer program products for oscillator calibration. In one aspect, a calibration module includes a monitor submodule that evaluates operation of a system to determine if the system is operating in a first mode or a second different mode, where the second clock source is not operating as expected in the second different mode; a calibration engine that determines a calibration value using the first clock source and the second clock source in response to the system operating in the first mode; and a register that stores the calibration value; where the calibration engine calibrates the first clock source using the calibration value and provides to the system the calibrated first clock source as a timing reference instead of the second clock source as the timing reference, in response to the system operating in the second different mode.

13 Claims, 6 Drawing Sheets

OSCILLATOR CALIBRATION FOR MOTOR CONTROLLER

CROSS-REFERENCE TO RELATED APPLICATIONS

This application claims priority to U.S. Provisional Application Ser. No. 60/940,837, for "Oscillator Calibration for Motor Controller," filed on May 30, 2007, now expired, which is incorporated by reference herein in its entirety.

TECHNICAL FIELD

The subject matter of this patent application relates to signal processing.

BACKGROUND

A conventional hard disk drive (HDD) can include a system clock and an internal clock. Typically, an internal oscillator can be used as a clock source for the internal clock. Due to variations in manufacturing or processing of the resistive and capacitive elements used in internal oscillators, oscillation frequencies can vary for different internal oscillators. Therefore, the internal clocks in HDDs may not be an accurate source of time.

As the size of conventional HDDs decrease, requirements for emergency parking of read/write heads of the HDDs can become more strict. During emergency parking, a motor controller can use a pre-determined sequence (e.g., a sequence determined from timing and voltage information) to safely land the read/write heads on non-data landing zones after the HDD has stopped operating. Typically, the system clock is used for timing. However, the system clock should not be used if the system clock is, for example, irregular, missing, or not powered.

SUMMARY

Methods, computer program products, and systems are described for oscillator calibration.

In one aspect, a calibration module is provided that calibrates a first clock source according to a second clock source. The calibration module includes a monitor submodule that evaluates operation of a system to determine if the system is operating in a first mode; a calibration engine that determines a calibration value using the first clock source and the second clock source in response to the system operating in the first mode; and a register that stores the calibration value.

In another aspect, a method is provided that includes evaluating operation of a system to determine if the system is operating in a first mode; and if the system is operating in the first mode, calibrating a first clock source using a second clock source. Calibrating a first clock source using a second clock source can include determining a calibration value using the first clock source and the second clock source, storing the calibration value, and calibrating the first clock source using the calibration value. Other embodiments of this aspect include corresponding systems, apparatus, and computer program products.

One or more implementations can optionally include one or more of the following features. Evaluating operation of the system can include determining if the system is powered, and determining if the second clock source is operating. The method can further include using the first clock source for a timing reference instead of the second clock source, if the second clock source is not operating. The method can further include powering the first clock source using an emergency power supply, if the system or the second clock source is not powered. The first clock source can be an internal oscillator and the second clock source can be used by a system clock.

In another aspect, a hard disk drive is provided that includes a system that includes a system clock and a motor controller. The motor controller includes a calibration module that calibrates an internal oscillator according to the system clock. The system includes a head actuator and a spindle.

One or more implementations can optionally include one or more of the following features. The calibration module can include a monitor submodule that evaluates operation of the system to determine if the system clock is operating and uses the internal oscillator for a timing reference if the system clock is not operating.

Particular embodiments of the subject matter described in this specification can be implemented to realize none, one or more of the following advantages. Oscillator calibration can increase the accuracy of an internal oscillator, allowing an internal oscillator (e.g., a resistor and capacitor based oscillator) to be used instead of a crystal oscillator, for example. In particular, oscillator calibration can minimize internal timing reference variations in HDDs allowing, for example: (i) more reliable emergency parking; (ii) more accurate spindle speed control; (iii) more accurate speed error detection; (iv) preservation of regulator performance (e.g., output ripple, peak current); and (v) increased ease of design for the internal oscillator.

The details of one or more embodiments of the invention are set forth in the accompanying drawings and the description below. Other features and advantages of the invention will be apparent from the description and drawings, and from the claims.

DETAILED DESCRIPTION

Figure 1:
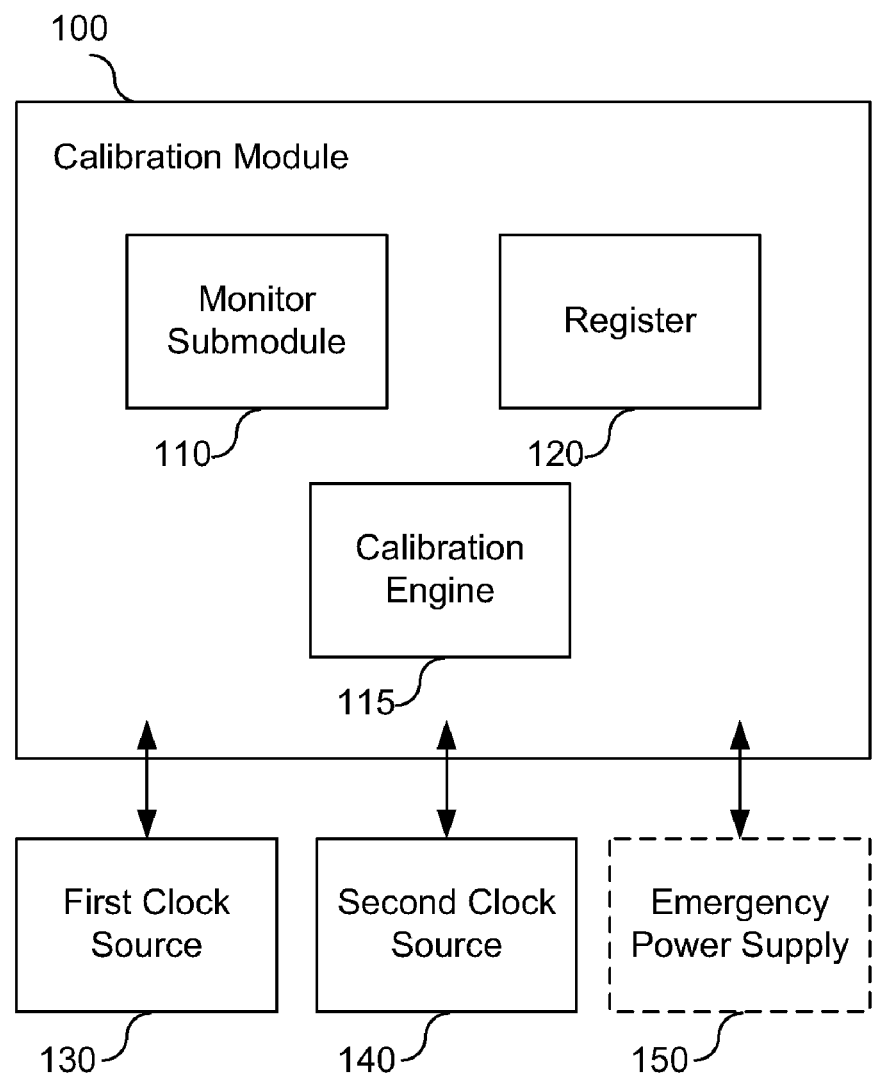
FIG. 1 is a conceptual block diagram of an example calibration module.

FIG. 1 is a conceptual block diagram of an example calibration module 100. The calibration module 100 can include a monitor submodule 110, a calibration engine 115, and a register 120 (e.g., a calibration register). Optionally, the calibration module 100 can be coupled to a first clock source 130 (e.g., an internal oscillator), a second clock source 140 (e.g., a crystal oscillator used by a system clock), and an emergency power supply 150.

The monitor submodule 110 can be used to monitor a system (e.g., a system on a chip in a hard disk drive). The monitor submodule 110 can be used to evaluate the system's operation to determine if the system is operating in a first mode (e.g., as expected or in accordance with a predetermined operating condition). In some implementations, the monitor submodule 110 can determine if the system is powered. For example, the monitor submodule 110 can detect an input voltage to the system. If the input voltage is below a pre-determined threshold voltage (e.g., an under-voltage), the monitor submodule 110 can determine that the system is not powered and that the system is not operating in the first mode.

In some implementations, the monitor submodule 110 can monitor the second clock source 140. For example, the monitor submodule 110 can include a circuit that monitors the second clock source 140. The circuit can determine if the second clock source 140 is operating. Examples of situations where the second clock source 140 is not operating include, but are not limited to, situations where the second clock source 140 is not powered (e.g., an input voltage to the second clock source 140 is below a pre-determined threshold voltage), the second clock source 140 is missing, the second clock source 140 is slow (e.g., a measured time corresponding to the second clock source 140 is behind an actual time), the second clock source 140 is fast (e.g., a measured time corresponding to the second clock source 140 is ahead of an actual time), and the second clock source 140 is irregular (e.g., oscillator frequency irregularities due to external shock).

The calibration module 100 can calibrate the first clock source 130 using the second clock source 140. For example, the first clock source 130 can be designed to oscillate at a frequency of 1 MHz. The frequency of the first clock source 130 can vary (e.g., variations of ±20-30%). The second clock source 140 can be designed to oscillate at a frequency of 20 MHz. Due to the design, the ratio of the frequency of the first clock source 130 to the frequency of the second clock source 140 is 1:20. The calibration module 100 (e.g., calibration engine 115) can determine a delta value (e.g., a calibration value) that indicates how much to change the oscillation frequency of the first clock source 130 to maintain the ratio. In some implementations, the ratio can be one to one.

The calibration value can be stored in the register 120. The first clock source 130 can be calibrated using the calibration value stored in the register 120. Returning to the previous example, the calibration value can be used to adjust the first clock source 130 to have an oscillation frequency of 1 MHz. In some implementations, the register 120 can be implemented using a flip-flop architecture.

The monitor submodule 110 can continue to monitor the second clock source 140. If the second clock source 140 is not operating, the first clock source 130 can be used for a timing reference instead of the second clock source 140. If the system or the second clock source 140 is not powered, the first clock source 130 can be powered using, for example, an emergency power supply 150. The calibration module 100, including the register 120, can also be powered using the emergency power supply 150. In some implementations, the emergency power supply 150 can be included in the calibration module 100. As an example, the emergency power supply can be a reservoir capacitor. As another example, the emergency power supply can be a supply of energy harnessed from an electromagnetic force (e.g., electromagnetic force created by a spinning spindle in a HDD).

Figure 2:
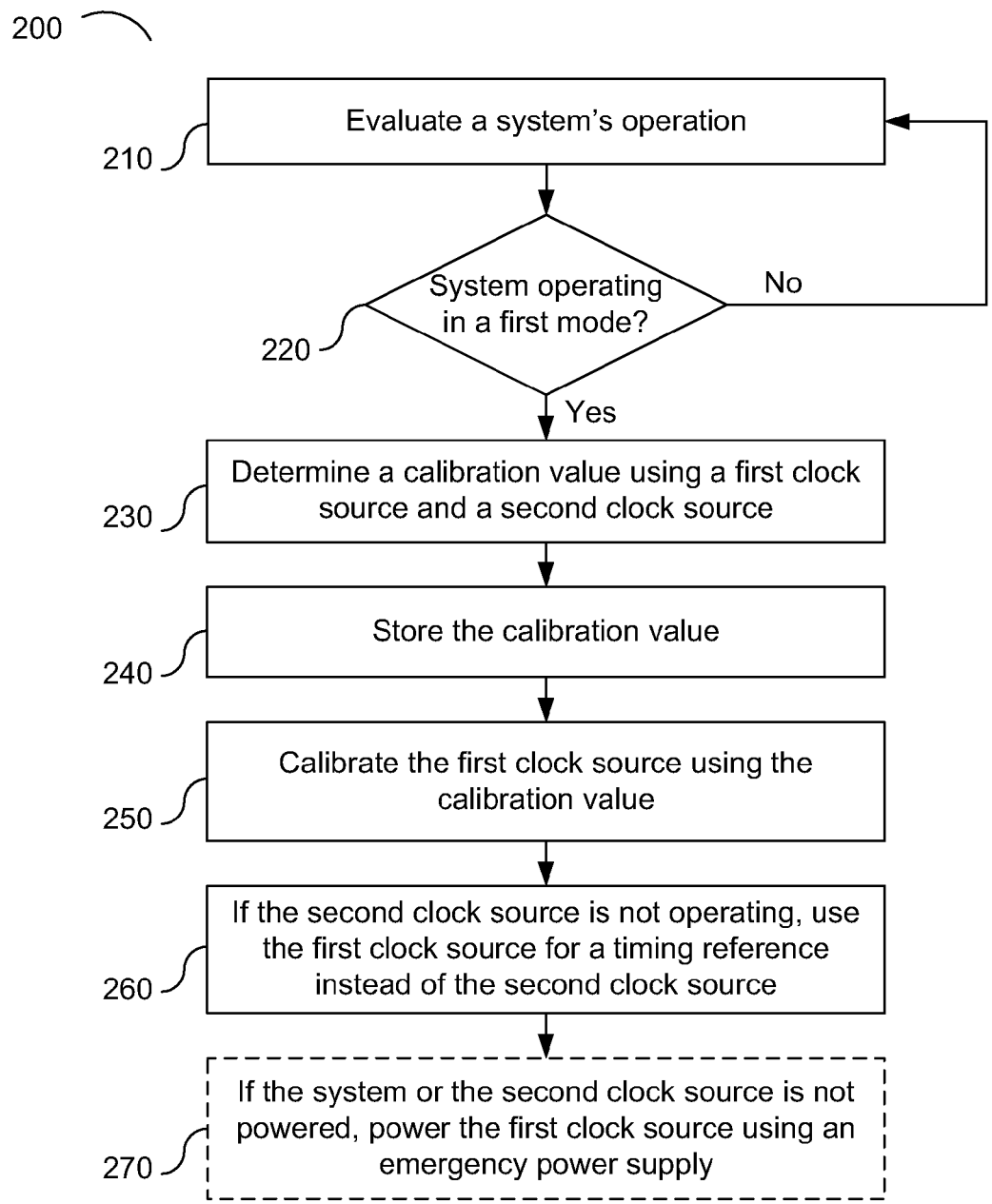
FIG. 2 is a flow chart showing an example process for calibrating an oscillator.

FIG. 2 is a flow chart showing an example process 200 for calibrating an oscillator. A system's operation is evaluated 210 to determine if the system is operating in a first mode (e.g., as expected). For example, the monitor submodule 110 can monitor the system to determine if the system is operating in the first mode. If the system is not operating in the first mode ("No" branch of step 220), the system's operation is evaluated 210.

If the system is operating in the first mode ("Yes" branch of step 220), a first clock source is calibrated using a second clock source. A calibration value is determined 230 using the first clock source and the second clock source. For example, the calibration module 100 (e.g., calibration engine 115) can determine the calibration value using the first clock source 130 and the second clock source 140. The calibration value is stored 240. For example, the calibration module 100 can store the calibration value in the register 120. The first clock source is calibrated 250 using the calibration value. For example, the calibration module 100 can use the calibration value to calibrate the first clock source 130.

If the second clock source is not operating, the first clock source is used 260 for a timing reference instead of the second clock source. For example, the first clock source 130 can be used for a timing reference instead of the second clock source 140. If the system or the second clock source is not powered, the first clock source can be powered 270 using, for example, an emergency power supply. For example, the first clock source 130 can be powered by the emergency power supply 150.

Figure 3:
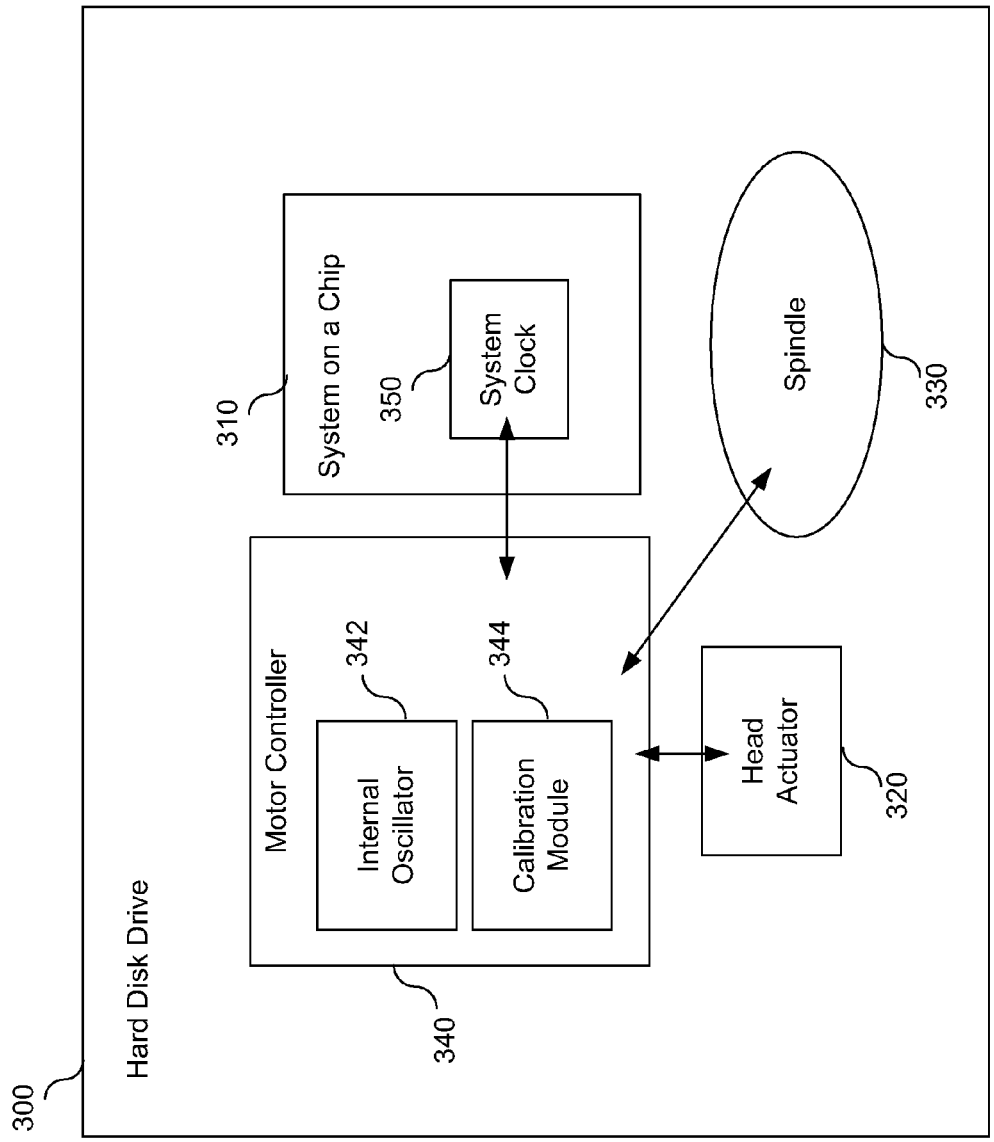
FIG. 3 is a conceptual block diagram of an example hard disk drive.

FIG. 3 is a conceptual block diagram of an example hard disk drive (HDD) 300. The HDD 300 can include a system on a chip (SOC) 310, a head actuator 320, a spindle 330, and a motor controller 340. In some implementations, the SOC 310 and motor controller 340 can be on a same chip. In some implementations, the head actuator 320 can be a stepper motor actuator. In some implementations, the head actuator 320 can be a voice coil motor (VCM). Read/write heads (not shown) can be attached to the head actuator to read and write data to platters (not shown) that can be clamped to the spindle 330.

The SOC 310 can include a system clock 350. The motor controller 340 can be used to control the head actuator 320 to move the read/write heads around the platters to read and write data to the platters. In some implementations, the system clock 350 can use a crystal oscillator as a clock source. The motor controller 340 can include an internal oscillator 342 and a calibration module 344. In some implementations, the system clock 350 can be included in the motor controller 340.

The calibration module 344 can be used to determine if the SOC 310 is operating in a first mode. In particular, the calibration module 344 can determine if the SOC 310 (including the system clock 350) is powered and if the system clock 350 is operating. If the SOC 310 is operating in the first mode, then the calibration module 344 can determine a calibration value using the internal oscillator 342 and a clock source (not shown) of the system clock 350, store the calibration value, and calibrate the internal oscillator 342 using the calibration value.

If the clock source of the system clock 350 is not operating, the internal oscillator 342 can be used for a timing reference instead of the clock source of the system clock 350. For example, if the clock source of the system clock 350 is irregular or in sleep mode, the internal oscillator 342 can be used as a timing reference. As another example, the clock source of the system clock 350 may not be operating if the HDD 300 is not powered (e.g., a power supply for the HDD 300 is removed) or if the HDD 300 is in certain states of a state machine (e.g., reset state). Emergency parking is performed to prevent the read/write heads from landing on the platters if the HDD 300 has stopped operating. During emergency parking, the clock source of the system clock 350 may not be operating and the internal oscillator 342 can be used for a timing reference in order to provide accurate timing information for emergency parking.

Because the internal oscillator 342 and calibration module 344 may require power, an emergency power supply (e.g., emergency power supply 150) can be used. For example, the emergency power supply can be a supply of energy harnessed from an electromagnetic force created by the spindle 330 as the spindle 330 spins. The emergency power supply can also be used to power a register that stores a pre-determined sequence (e.g., a sequence determined from timing and voltage information) used to perform emergency parking.

Figure 4B:
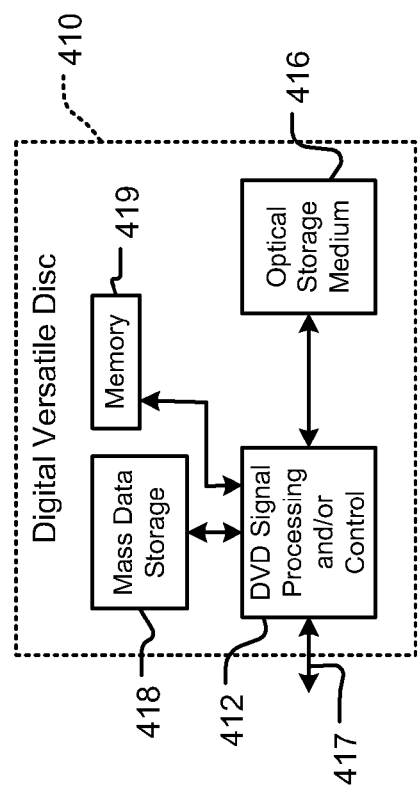
FIGS. 4A-4G show various example implementations of the described systems and techniques.
Figure 4A:
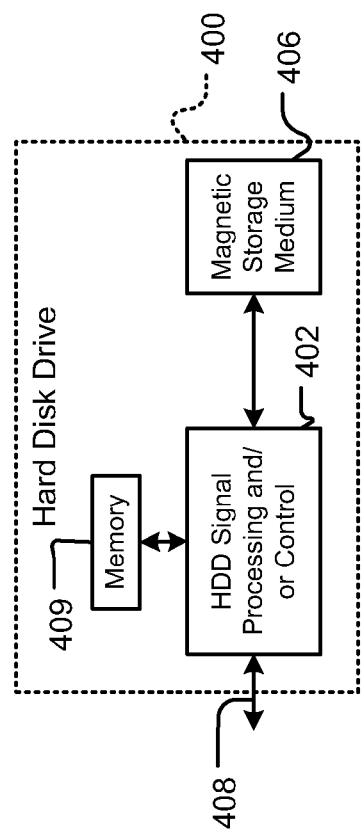

FIGS. 4A-4G show various example implementations of the described systems and techniques. Referring now to FIG. 4A, the described systems and techniques can be implemented in a hard disk drive (HDD) 400. The described systems and techniques may be implemented in either or both signal processing and/or control circuits, which are generally identified in FIG. 4A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 4B, the described systems and techniques can be implemented in a digital versatile disc (DVD) drive 410. The described systems and techniques may be implemented in either or both signal processing and/or control circuits, which are generally identified in FIG. 4B at 412, and/or mass data storage of the DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 4A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Figure 4D:
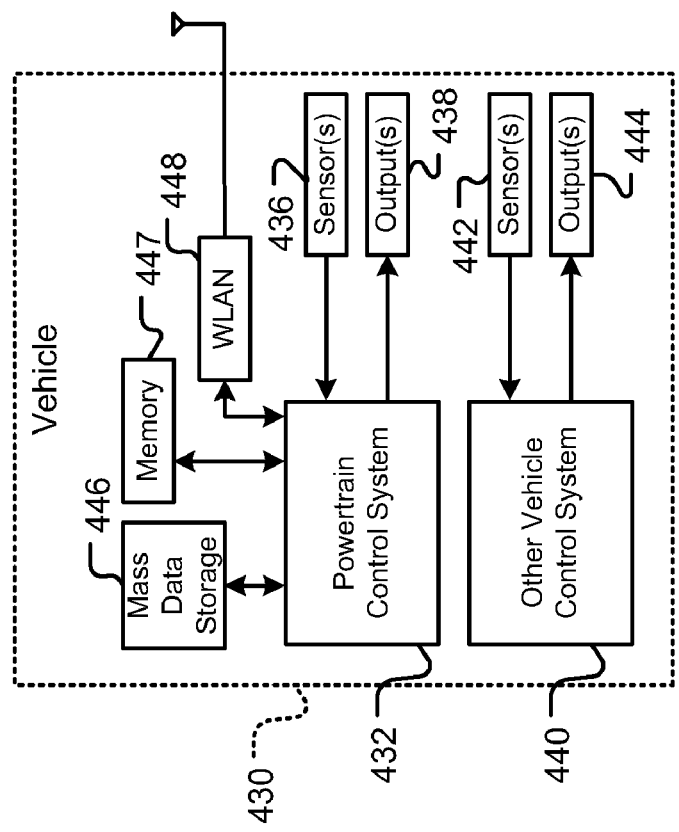
Figure 4C:
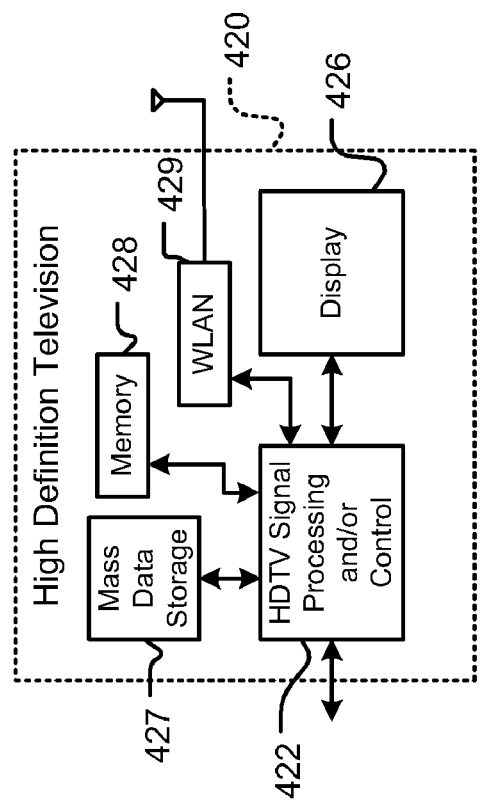

Referring now to FIG. 4C, the described systems and techniques can be implemented in a high definition television (HDTV) 420. The described systems and techniques may be implemented in either or both signal processing and/or control circuits, which are generally identified in FIG. 4C at 422, a WLAN interface and/or mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN interface 429.

Referring now to FIG. 4D, the described systems and techniques may be implemented in a control system of a vehicle 430, a WLAN interface and/or mass data storage of the vehicle control system. In some implementations, the described systems and techniques may be implemented in a powertrain control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 438.

The described systems and techniques may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN interface 448. The control system 440 may also include mass data storage, memory and/or a WLAN interface (all not shown).

Figure 4E:
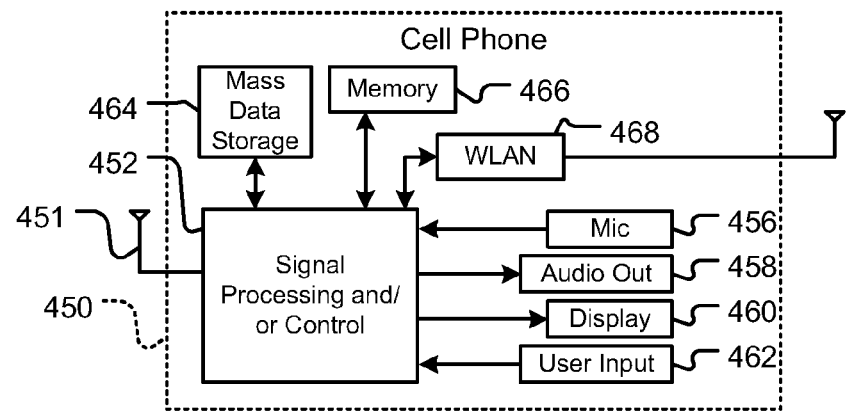

Referring now to FIG. 4E, the described systems and techniques can be implemented in a cellular phone 450 that may include a cellular antenna 451. The described systems and techniques may be implemented in either or both signal processing and/or control circuits, which are generally identified in FIG. 4E at 452, a WLAN interface and/or mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN interface 468.

Figure 4F:
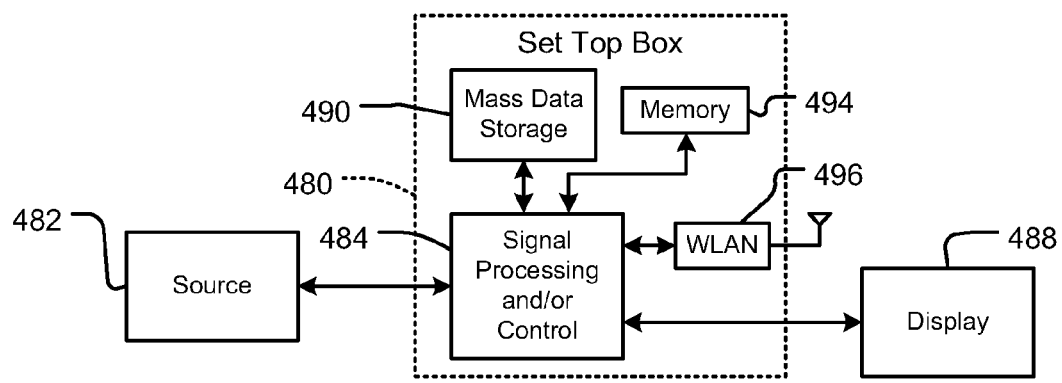

Referring now to FIG. 4F, the described systems and techniques can be implemented in a set top box 480. The described systems and techniques may be implemented in either or both signal processing and/or control circuits, which are generally identified in FIG. 4F at 484, a WLAN interface and/or mass data storage of the set top box 480. The set top box 480 receives signals from a source 482 such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN interface 496.

Figure 4G:
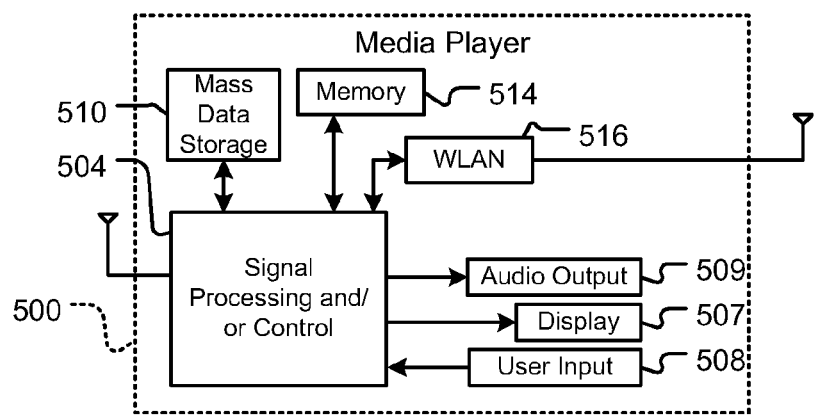

Referring now to FIG. 4G, the described systems and techniques can be implemented in a media player 500. The described systems and techniques may be implemented in either or both signal processing and/or control circuits, which are generally identified in FIG. 4G at 504, a WLAN interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN interface 516. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A calibration module to calibrate a first clock source according to a second clock source, the calibration module including:
   a monitor submodule that evaluates operation of a system to determine if the system is operating in a first mode or a second different mode, wherein the second clock source is not operating as expected in the second different mode;
   a calibration engine that determines a calibration value using the first clock source and the second clock source in response to the system operating in the first mode; and
   a register that stores the calibration value;
   wherein the calibration engine calibrates the first clock source using the calibration value and provides to the system the calibrated first clock source as a timing reference instead of the second clock source as the timing reference, in response to the system operating in the second different mode.

2. The calibration module of claim 1, wherein the first mode is a mode that is in accordance with an operating condition.

3. The calibration module of claim 1, wherein the second clock source is not operating as expected when the second clock source is not powered.

4. A method to calibrate a first clock source according to a second clock source, the method comprising:
   evaluating operation of a system to determine if the system is operating in a first mode or a second different mode, wherein the second clock source is not operating as expected in the second different mode;
   if the system is operating in the first mode, calibrating a first clock source using a second clock source, including:
      determining a calibration value using the first clock source and the second clock source,
      storing the calibration value, and
      calibrating the first clock source using the calibration value;
   providing to the system the second clock source as a timing reference in response to the system operating in the first mode; and
   providing to the system the calibrated first clock source as the timing reference instead of the second clock source as the timing reference, in response to the system operating in the second different mode.

5. The method of claim 4, wherein evaluating operation of the system includes:
   determining if the system is powered; and
   determining if the second clock source is operating.

6. The method of claim 5, further comprising:
   if the system or the second clock source is not powered, powering the first clock source using an emergency power supply.

7. The method of claim 4, wherein the first clock source is an internal oscillator and the second clock source is used by a system clock.

8. The method of claim 4, wherein the second clock source is not operating as expected when the second clock source is not powered.

9. A system to calibrate a first clock source according to a second clock source, the system comprising:
   means for evaluating operation of a system to determine if the system is operating in a first mode or a second different mode, wherein the second clock source is not operating as expected in the second different mode;
   if the system is operating in the first mode, means for calibrating the first clock source using the second clock source, including:
      means for determining a calibration value using the first clock source and the second clock source,
      means for storing the calibration value, and
      means for calibrating the first clock source using the calibration value;
   means for providing to the system the second clock source as a timing reference in response to the system operating in the first mode; and
   means for providing to the system the calibrated first clock source as the timing reference instead of the second clock source as the timing reference, in response to the system operating in the second different mode.

10. The system of claim 9, wherein means for evaluating operation of the system include:
    means for determining if the system is powered; and
    means for determining if the second clock source is operating.

11. The system of claim 10, further comprising:
    if the system or the second clock source is not powered, powering the first clock source using an emergency power supply.

12. The system of claim 9, wherein the first clock source is an internal oscillator and the second clock source is used by a system clock.

13. The system of claim 9, wherein the second clock source is not operating as expected when the second clock source is not powered.

* * * * *